United States Patent
Rosu et al.

(10) Patent No.: US 7,711,812 B2
(45) Date of Patent: May 4, 2010

(54) DEFINITION SYSTEM AND METHOD FOR WEB SERVICES THAT MONITOR OTHER WEB SERVICES

(75) Inventors: Marcel C. Rosu, Ossining, NY (US); Mandayam T. Raghunath, Fishkill, NY (US); Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 1207 days.

(21) Appl. No.: 10/872,283

(22) Filed: Jun. 18, 2004

(65) Prior Publication Data

US 2005/0283528 A1  Dec. 22, 2005

(51) Int. Cl.
G06F 15/173 (2006.01)

(52) U.S. Cl. ...................................... 709/224
(58) Field of Classification Search .................. 709/224
See application file for complete search history.

(56) References Cited

U.S. PATENT DOCUMENTS

| | | | |
|---|---|---|---|
| 2003/0172196 A1* | 9/2003 | Hejlsberg et al. | 709/328 |
| 2003/0233602 A1* | 12/2003 | Lindquist et al. | 714/47 |
| 2004/0030947 A1* | 2/2004 | Aghili et al. | 714/1 |
| 2005/0182843 A1* | 8/2005 | Reistad et al. | 709/230 |
| 2005/0246716 A1* | 11/2005 | Smith et al. | 719/315 |
| 2006/0004802 A1* | 1/2006 | Phillips et al. | 707/101 |
| 2006/0179150 A1* | 8/2006 | Farley et al. | 709/228 |
| 2007/0081197 A1* | 4/2007 | Omoigui | 358/403 |

* cited by examiner

*Primary Examiner*—John Follansbee
*Assistant Examiner*—Alan S Chou
(74) *Attorney, Agent, or Firm*—Jeffrey N. Giunta; Fleit Gibbons Gutman Bongini & Bianco P.L.

(57) ABSTRACT

A web service development tool and method that allows a functional web service developer to associate a developed functional web service with a Web service Description Language (WSDL) document that contains a reference to a separate monitoring web service. The separate monitoring web service is specified as a Universal Resource Identifier (URI) in the Web Service Description Language (WSDL) document for a functional web service being. The web service developer includes instrumentation functions in the functional web service to collect data related to the performance of the web service. This collected data is then made available to the monitoring web service to support analysis of performance data for the executing functional web service.

33 Claims, 4 Drawing Sheets

DEFINITION SYSTEM AND METHOD FOR WEB SERVICES THAT MONITOR OTHER WEB SERVICES

BACKGROUND OF THE INVENTION

1. Field of the Invention

The present invention generally relates to the field of computer software, and more particularly relates to design and development of software to that operates across communications network interfaces.

2. Description of Related Art

Web services are a method of providing distributed processing to allow physically or organizationally disparate entities to present an integrated computational application. As an example of such a web service where a retailer is able to provide an interface, through a web service, to external organizations that allows those external organizations to retrieve inventory, pricing, and other data about the retailer's products. Such web services further allow the external organization to place or obtain the status of orders from that retailer. This web service can, for example, be used by a World Wide Web application operated by the external organization to provide a convenient interface to the retailer's products.

Web services are described, for example, through one or more Web Services Description Language (WSDL) documents. WSDL documents are XML documents that conform to a standard format and that describe one or more network services. WSDL documents describe these network services as a set of endpoints that operate on messages containing either document-oriented or procedure-oriented information. WSDL files generally contain end point definitions for the functional network services that are the true focus of that particular web service.

Operators of web services, such as the retailer described above, desire to monitor the operational performance of their web services to ensure proper and adequate service to their clients. Conventional methods for monitoring web services are intrusive. Exemplary systems periodically invocate the web service operations to detect and signal any performance degradation. Such an approach is used by companies such as Keynote Systems to monitor web server/site performance. These conventional approaches are generally less accurate since they capture the performance, e.g., processing delays, for only a small subset of invocations for that web service. These approaches similarly increase the processing load of the web service by introducing the additional monitoring-related invocations. This increased loading has increased impact during high-load intervals, the time when monitoring web services performance is very important. These approaches are further limited to monitoring stateless web services.

Monitoring of web services can entail further limitations. Some transactions that are provided by a web service, such as a query for a retailer's inventory, can be processed by a single server. Other transactions entail some processing steps that are performed by a second server, which is possibly at a different business, such as a partner, supplier, and so forth.

Intrusive monitoring of stateful web services requires the creation of several test client accounts. Dummy accounts on each of the transaction servers are also created for each of these client accounts. The test client accounts in such systems are configured to periodically initiate a transaction that simulates a real transaction. In the case of having the second server perform some of the processing for a transaction, the dummy accounts may not be available on the second server (because it is under the control of a different entity). In such a situation, the original server has to estimate or guess the performance of the second server in order to support an intrusive web services monitor.

Existing non-intrusive schemes for monitoring a web service include modifying the service's WSDL file to include additional endpoints that define monitoring functions for that web service. Including these monitoring endpoints in such WSDL structures have a disadvantage that the monitoring endpoint and its operations are tied to the particular web service defined by that WSDL document. This restricts the flexibility in the design of the monitoring service. For example, the external interfaces and functions of the monitoring service for this web service are defined within the functional web service WSDL document. Modification of the available monitoring functions for this web service thereby requires modification, regression testing and redeployment of the entire web service.

More elaborate web service architectures, such as such as the architecture defined by the Open Grid Services Infrastructure (OGSI), include a fairly complex monitoring component. However, such web service architectures have not gained significant market acceptance.

Therefore a need exists to overcome the problems with the prior art as discussed above, and particularly for a way to more efficiently monitor web services.

SUMMARY OF THE INVENTION

According to one aspect of an example embodiment of the present invention, a web service development tool includes a web service definition tool that define at least one web service description language document. The at least one web service description language document defines a web service. The web service development tool further includes a monitor tag inserter that includes, in the at least one web service description language document, a reference to a web service description language document for a monitoring service. The web service development tool further includes an accumulation function generator that includes in the web service at least one monitor data collection function that records at least one monitor data element that is made available to the monitoring service.

According to another aspect of an example embodiment of the present invention, a method for defining a service monitor for a web service includes defining at least one web service description language document defining a web service. The method further includes, in at least one web service description language document, a reference to a web service description language document for a monitoring service. The method also includes including in the web service at least one monitor data collection function that records at least one monitor data element that is made available to the monitoring service.

DESCRIPTION OF THE PREFERRED EMBODIMENTS

The present invention, according to a preferred embodiment, overcomes problems with the prior art by allowing a web service developer to specify a reference to a separate monitoring web service for the web service under development. In exemplary embodiments, this separate monitoring web service is specified as a Universal Resource Identifier (URI) in the Web Service Description language (WSDL) document for a functional web service. The web service developer is able to include instrumentation functions, as described below, to collect data related to the performance of the web service. This collected data can then be accessed by the monitoring web service to determine performance data for the executing web service.

Figure 1:
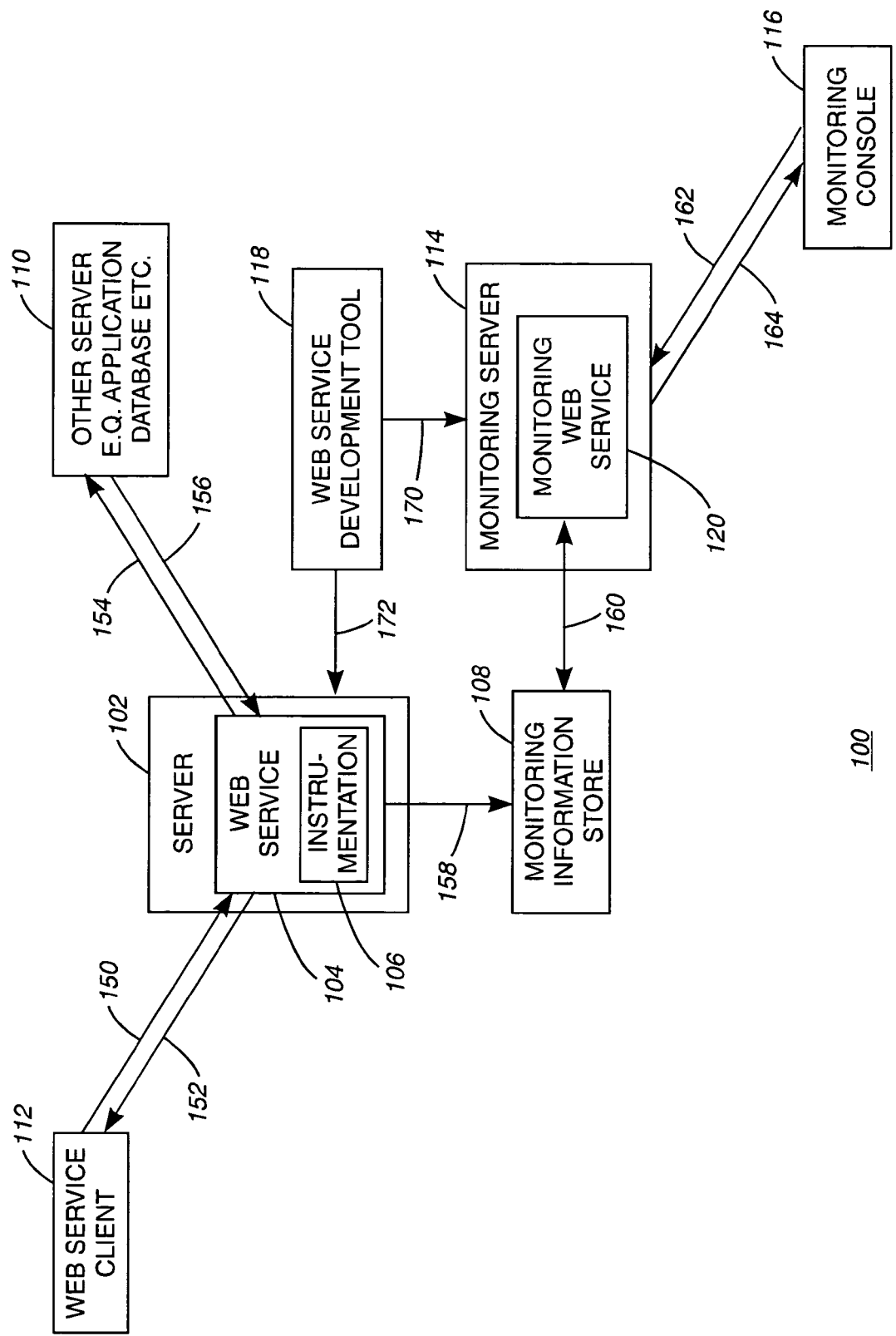
FIG. 1 illustrates a processing resource architecture diagram for processing resources that host an exemplary embodiment of the present invention.

FIG. 1 illustrates a processing resource architecture diagram 100 for processing resources that host an exemplary embodiment of the present invention. The processing resource architecture diagram 100 illustrates a web services server 102 that hosts one or more functional web services, such as functional web service 104. Functional web service 104 receives service requests 150 from a web service client 112. The exemplary embodiment of the present invention is able to communicate and simultaneously operate with many web service clients, such as the exemplary web service client 112. Some embodiments operate with a single web service client or in various modes to interoperate with various types or classes of web services clients. The service requests 150 that can be accepted by the functional web service 104 of the exemplary embodiment include information requests, purchase orders, and any other information that functional web service 104 is configured to accept from web service clients, such as the exemplary web service client 112.

In the operation of the functional web service 104, data or other requests 154 are forwarded by the functional web service 104 to the other server 110. Other server 110 in the exemplary embodiment is a specialized application and/or database server to provide functions required to provide response to service requests 150 sent by web service client 112. Other server 110 provides data responses 156 to the functional web service 104 and functional web service 104, in turn, provides a service response 152 back to the web service client 112, based at least in part upon the data responses 156.

The other server 110 of the exemplary embodiment is able to be a single server or a distributed data processing system that has multiple servers, processing sub-systems, or associated systems that operate to perform various tasks. The other server 110 is further able to include servers that are operated and/or maintained by different organizations or entities. For example, other server 110 is able to include a server operated by a weather forecasting service to provide weather reports and/or a further server that implements a retailer's inventory and/or purchase order processing application. This distributed server would allow a remote system, such as functional web service 104 and ultimately web service client 112, to be provided with weather reports, a retailer's inventory and/or purchase order acceptance interface.

Functional web service 104 includes instrumentation processing 106 that determines monitor data elements 158 and stores those monitor data elements 158 into a monitoring information store 108. Instrumentation processing 106 is a monitor data collection function in the exemplary embodiment that records at least one monitor data element that is made available to the monitoring web service 120, as is described below. Monitor data elements 158 in the exemplary embodiment include many data elements relevant to the operation of functional web service 104. For example, monitor data elements 158 in the exemplary embodiment include the start time for processing of each request by a web service client 112 for an operation by the web service, the end time for the processing of that request, and the operation and end point name, input parameters for the operation or operations that were performed in response to that request, the result of each operation and the respective request, and any other data that is desired to be collected by the developer of the functional web service 104 in order to support performance monitoring or any other purpose. Further examples of monitor data elements include raw data elements that are actual data associated with the monitored web service. Examples of raw data elements include, but are not limited to, an execution time for a monitored processes, a response time for a query to an external data source, network addresses for clients invoking the monitored web service, and so fourth. Monitor data elements are further able to include a summary of raw data elements. Examples of raw data element summaries include, but are not limited to, an average value of a raw data element, a minimum value of a raw data element, a maximum value of a raw data element, a distribution of values of a raw data element, a periodically collected raw data element and a summary of a pre-defined number of raw values. An example of a periodically collected raw data element is a sample of every tenth value of a raw data element.

The exemplary embodiment of the present invention advantageously determines and/or collects these monitor data elements 158 as actual users or processes that are using web service client 112 send service requests 150 to the functional web service 104 and therefore do not require dummy requests submitted only for the purposes of performance monitoring. This architecture further allows data for all or a specified subset of service requests 150, or specified transactions, to be collected. Different data is similarly able to be collected for different types of requests and/or transactions. The exemplary embodiment of the present invention further allows observation, determination and collection of monitor data elements 158 that are related to intermediate processing steps within the functional web service 104, thereby facilitating the monitoring of stateful web services.

The instrumentation processing 106 of the exemplary embodiment further includes a counter of events that are associated with the web service 102. Events counted by the instrumentation processing 106 includes a number of requests received from web service clients, such as web service client 112, a number of data and other requests 154 sent to other server 110, and any other events that affect or are affected by the operation of functional web service 104.

Monitor data elements 158 are stored by the instrumentation processing 106 in a monitoring information store 108 in the exemplary embodiment. The monitoring information store 108 is able to be any data storage structure or device that is suited to the requirements of that particular embodiment. For example, the exemplary embodiment operates a Data Base Management System (DBMS) to support operation of the monitoring information store 108. This monitoring information store 108 is able to include a DBMS that operates on server 102, i.e., the same server as is hosting functional web service 104. In order to improve the capacity of functional web service 104, however, the monitoring information store 108 is able to utilize a DBMS operating on a different server, that is distributed among multiple servers that may or may not include the server 102 that is hosting functional web service 104. Further embodiments of the present invention utilize other monitoring information store architectures that are sufficient for those embodiments, such as memory resident data storage and other lower or higher capacity information storage techniques that are adequate for the monitor data elements accumulated by the instrumentation processing 106. Yet further embodiments use various means to make monitor data elements available to the monitoring web service 120, described below.

A monitoring web service 120 executes on a monitoring server 114. Monitoring web server 120 in the exemplary embodiment is separate from server 102 which hosts execution of the functional web service 104 being monitored. Further embodiments operate the monitoring web service 120 on server 102. Executing both the functional web service 104 and the monitoring web service 120 on server 102 increases the processing load placed on server 102. This can result in degrading the performance of functional web service 104 when that web service is undergoing heavy use by web service clients 112. Executing the monitoring web service 120 on a monitoring server 114 advantageously allows more processing resources to be used by functional web service 104. The monitoring web service 120 of the exemplary embodiment, as is described herein, is adaptable for use with, and is able to monitor, multiple functional web services, such as functional web service 104. Executing such a monitoring web service 120 on a separate server facilitates the central monitoring of multiple web services in some applications. The design of the exemplary embodiment allows free reconfiguration of servers to host the execution of both functional web services and monitoring web services as needs change and/or grow.

The monitoring web service 120 provides monitoring information 164 to a monitoring console 116. Monitoring console 116 is further able to provide monitoring commands 162 to the monitoring web service 120. Monitoring commands 162 include queries which, for example, identify monitoring information of interest by specifying the end point identifier, including the service name, etc., and the operation name. A monitoring command query is also able to specify a time interval of interest for which monitoring information is to be provided. Monitoring commands 162 can also include a command to reset the counters at the monitoring information store 108 in order to start a new monitoring interval of interest. In order to allow proper operation of the monitoring web service 120, access permissions for the monitoring console 116 are different from those set for the functional web service 104.

A web service development tool 118 allows one or more web service developers to develop both functional web services, such as web service 104, and monitoring web services, such as monitoring web service 120. Web service development tools 118 used by the exemplary embodiment include commercially available XML and Web Service Description Language (WSDL) development tools. Examples of such tools include the open-source Eclipse Integrated Development Environment (IDE), IBM's Websphere Studio Application Developer (WSAD), based on Eclipse, and Microsoft's Visual Studio .Net. The web service development tools 118 allow a web service developer to define at least one XML document that contains a WSDL for one or more web services. The web service development tools 118 of the exemplary embodiment have been adapted to automatically include monitoring tags into the WSDL documents for functional web services by inserting them at proper locations in the WSDL files, as is described below. The web service development tools 118 provide fully developed functional web service 104 and monitoring web service 120 packages to the server 102 and monitoring web server 114, respectively, for execution and operation.

Figure 2:
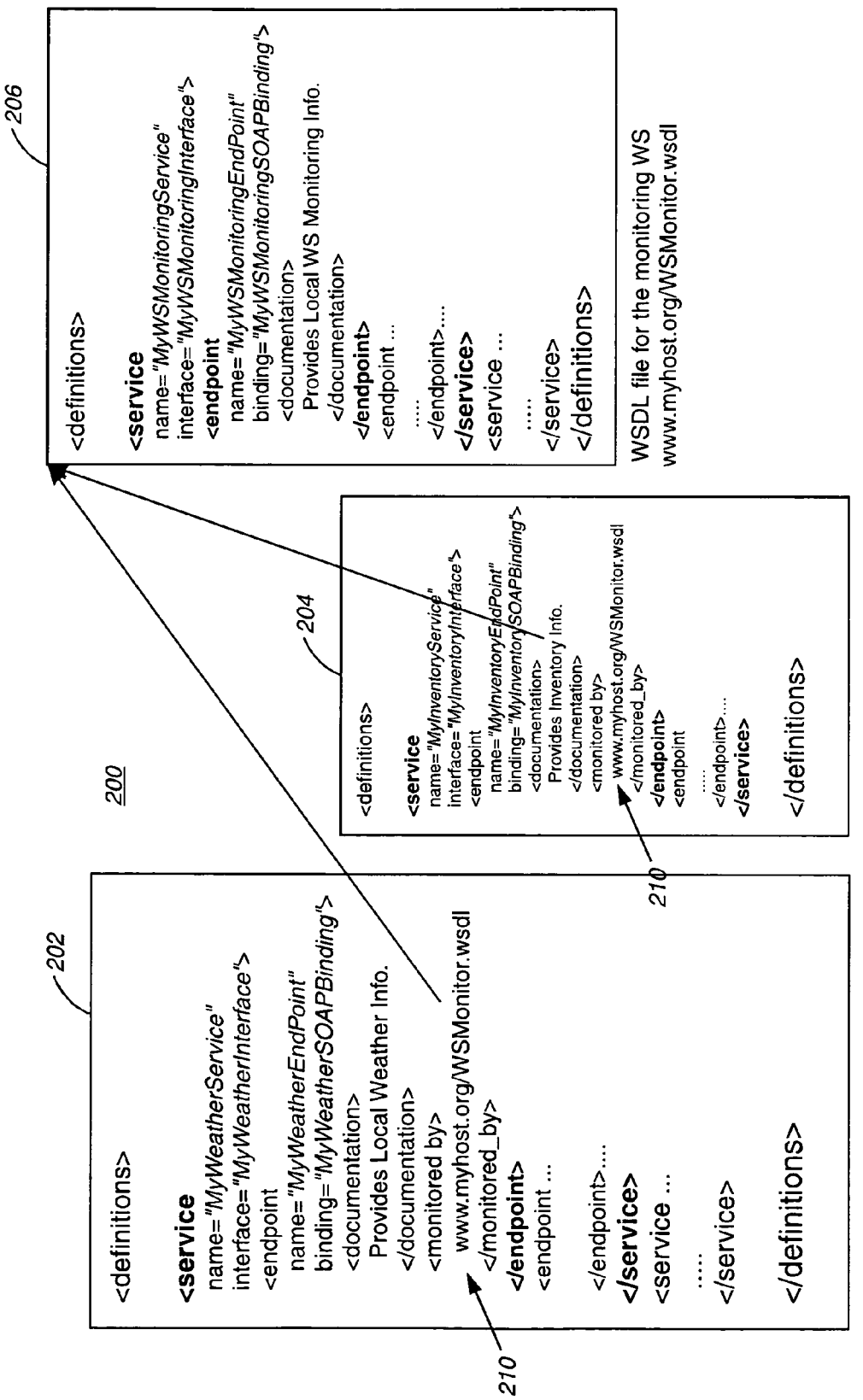
FIG. 2 illustrates Web Service Description Language (WSDL) documents according to an exemplary embodiment of the present invention.

FIG. 2 illustrates Web Service Description Language (WSDL) documents 200 according to an exemplary embodiment of the present invention. These WSDL documents comply with WSDL standards, such as the WSDL 1.1 specification available from the World Wide Web Consortium. The illustrated WSDL documents include a first functional web service description document 202, a second functional web service description document 204 and a monitoring web service description document 206. The first functional web service description document 202 is a WSDL document that corresponds to functional web service 104. The monitoring web service description document 206 is a WSDL document that corresponds to monitoring web service 120. The second functional web service description document 204 is a WSDL document that corresponds to a second functional web service (not shown). The second functional web service is able to be hosted on server 102, or another server that is physically collocated with server 102 and/or monitoring server 114. The second functional web service is also able to be hosted on another server that is physically removed from either or both of these servers, according to the requirements of a particular application.

The monitoring web service description document 206 describes the monitoring web service 120 including a description of interface information in accordance with WSDL standards. The functional web service description documents, such as the first functional web service description document 202 and the second functional web service document 204, describe their associated functional web services and each includes a monitoring tag 210 that is a reference to a monitor XML document that contains a WSDL for the monitoring service associated with the monitoring WSDL file 206. The monitoring tag 210 of the exemplary embodiment includes the tag identifier "monitored by." This tag identifier is defined for the exemplary embodiment of the present invention and is not defined by conventional WSDL standards. The monitoring tag 210 further includes a reference to the monitoring WSDL file 206. In this exemplary embodiment, the monitoring WSDL file 206 is identified by the Universal Resource Identifier (URI) "www.myhost.org/WSMonitor.wsdl," which is included as a reference in the monitoring tag 210. The monitoring tag 210 in this exemplary embodiment associates end points of the functional web service with the WSDL document for the monitoring service, e.g., monitoring WSDL file 206.

In this exemplary embodiment, each end point in a web service is associated with a potentially different monitoring web service 120. Different end points described in the same WSDL are able to share the same monitoring web service 120 if that is desired. A developer is also able to define end points that have no associated monitoring services.

Further embodiments of the present invention associate monitoring tags 210 with the web service itself instead of with an end point of the web service. In these embodiments, all of the end-points are monitored by the same monitoring web service. In yet further embodiments, a monitoring tag 210 is associated with the entire WSDL file. This causes all services and their respective end points to be monitored by a single monitoring web service. Some embodiments utilize combinations of these options. In all of these exemplary embodiments, it is possible for one monitoring service to be shared by multiple functional web service end points. Various web service development tools 118 allow the developer of functional web services to automatically insert monitoring tags 210 as desired to implement these various embodiments in different, or even the same, WSDL files.

Some embodiments of the present invention implement these new monitoring tags by using the existing '<documentation>' XML tag together with a specific format of the documentation text (labeled as 'documentation' or comment). These embodiments allow 'old'/existing clients, that do not understand the new monitoring tag, to parse the WSDL document correctly, i.e., they ignore the monitoring information.

Figure 3:
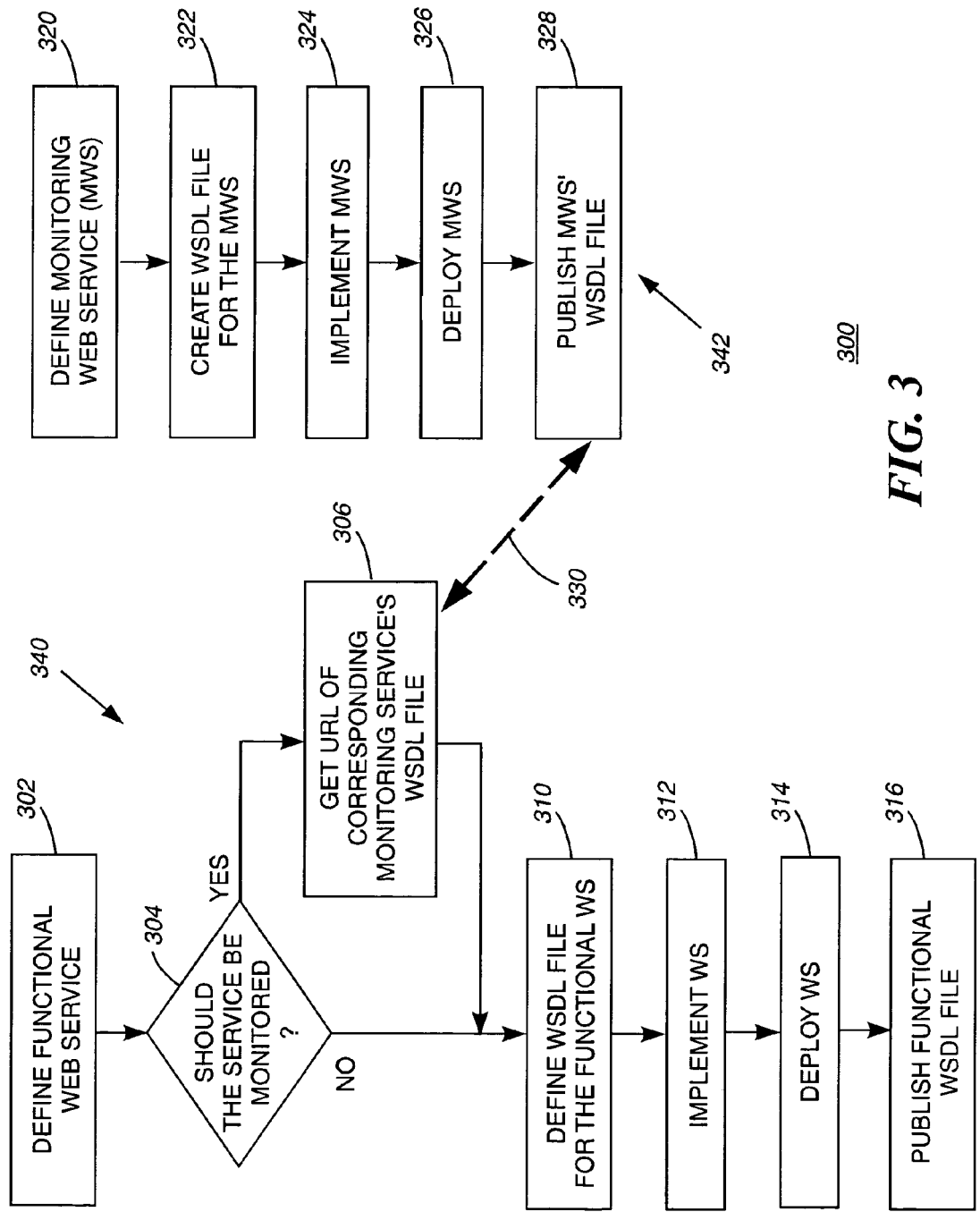
FIG. 3 illustrates a top level monitored web service development flow diagram according to the exemplary embodiment.

FIG. 3 illustrates a top level monitored web service development flow diagram 300 according to the exemplary embodiment. The top level monitored web service development flow 300 includes two web services development processes, a functional web service development flow 340 and a monitoring web service development flow 342. These two development flows are performed in an automated manner under computer control by the web service development tools 118 in the exemplary embodiment.

The exemplary embodiments of the present invention allow the functional web service 104 and the monitoring web service 120 to be developed independently of each other. This advantageously allows the functional web service 104 to be developed before or after the monitoring web service 120 is developed. This further allows either or both of the functional web service 104 and/or the monitoring web server to continue to be developed after deployment of the combined system. The structure of functional and monitoring web services provided by the exemplary embodiments of the present invention allows, for example, functional web services to be deployed while monitoring web services are able to be subsequently modified or otherwise maintained without modification, regression testing and redeployment of the functional web service or web services that the monitoring web service monitors. This greatly facilitates reuse, maintenance and improvement of the monitoring web service 120 and incorporation of this monitoring web service into newly developed, maintained and/or improved functional web services.

The monitoring web service development flow 342 begins by defining, at step 320, the monitoring web service 120. After the monitoring web service is defined, the development continues with creating, at step 322, a monitoring WSDL file 206 for the monitoring web service 120. The development flow continues by implementing, at step 324, and deploying, at step 326, the monitoring web service 120. After the monitoring web service 120 is deployed, the monitoring WSDL file 206 for that monitoring web service 120 is published, at step 328, for inclusion into a functional web service 104 during its development, as is described in detail below. Publishing of the monitoring WSDL file 206 is performed in the exemplary embodiment by making this file available to web service developers and making a Universal Resource Identifier (URI) available to allow accessing this monitoring WSDL file 206. It is to be noted that in this exemplary embodiment, the monitoring WSDL file 206 is created prior to implementation and deployment of the monitoring web service 120 and that document can be included in the development of a functional web service prior to the implementation and deployment of the monitoring web service 120.

The functional web service development flow 340 begins by defining the function web service 302. The functional web service development flow 340 continues by the developer determining, at step 304, if this functional web service 104 should be monitored. Determining if a functional web service should be monitored is a design decision left to the discretion of the system architect in the exemplary embodiment. Typically, web services deployments that are associated service level agreements (SLAs) are required to include performance monitoring mechanisms. If the functional web service 104 is to be monitored, the development flow continues by retrieving, at step 306, a Universal Resource Indicator (URI) for a monitoring service WSDL file, such as monitoring WSDL file 206.

The development flow then continues by defining, at step 310, a WSDL file for the functional web service, such as web service 104. If this web service was determined to be monitored, the URI of the monitoring service WSDL file 206 is included with a monitoring tag 210 that is placed into this WSDL file, such as the first functional WSDL file 202, for the web service being developed. The web service development tool 118 of the exemplary embodiment includes a monitor tag inserter to insert the monitoring tag 210 in the WSDL file for this web service. The processing continues by implementing, at step 312, and deploying, at step 314, the functional web service 104. The WSDL file, such as the first WSDL file 202, for the functional web service 104 is then published, at step 316.

The web service development tools 118 include a web service definition tool that assists a developer in defining at least one web service description language document 202 that defines a web service 104. The web service development tools 118 further include an accumulation function generator to include at least one monitor data collection function into the functional web service 104.

The exemplary embodiments of the present invention extend the web service definition provided in the WSDL file for an associated functional web service by adding an optional link, or Uniform Resource Identifier—URI, that references a definition of a monitoring service for that functional web service. More specifically, one or more of the web service definitions in an original WSDL file is extended with an optional monitoring field or monitoring tag 210, which includes the URI of the monitoring service associated with the original service.

The exemplary embodiments of the present invention allow, although do not require, the definition of the monitoring services to be largely independent of the monitored web services. More specifically, monitoring services are able to share the same portType definition or a version number of the same portType definition as defined in a WSDL document. This portType definition includes operations for collecting statistics, such as number of invocations, average latency, etc., for the operations of the monitored functional web service. The name of the monitored operation of the web service is a parameter of the monitoring operation in the exemplary embodiments. As a result, the monitoring operations of the monitoring web services of the exemplary embodiments are generic. This characteristic allows identical portType definitions to be used by multiple monitoring services and simplifies the implementation of functional web service monitoring applications. Binding and service definitions of monitoring services are typically determined by the corresponding definitions of the monitored web service, as monitored and monitoring web services are likely to specify the same transport protocol and host name.

Typically, the WSDL file associated with the monitoring service defines only one service and the definition of the monitoring service does not include the (optional) monitoring field. These are not requirements for these embodiments: a developer can define more than one monitoring service to monitor a given web service and web service monitoring services can be associated with other monitoring services. Having more than one monitoring service per web service is useful, for instance, when accommodating successive versions of the monitoring service.

The exemplary embodiments of the present invention can be used to support load balancing between web service servers in the same or remote clusters. Such load balancing is similar to load balancing commonly performed between and among HTTP Web servers.

Figure 4:
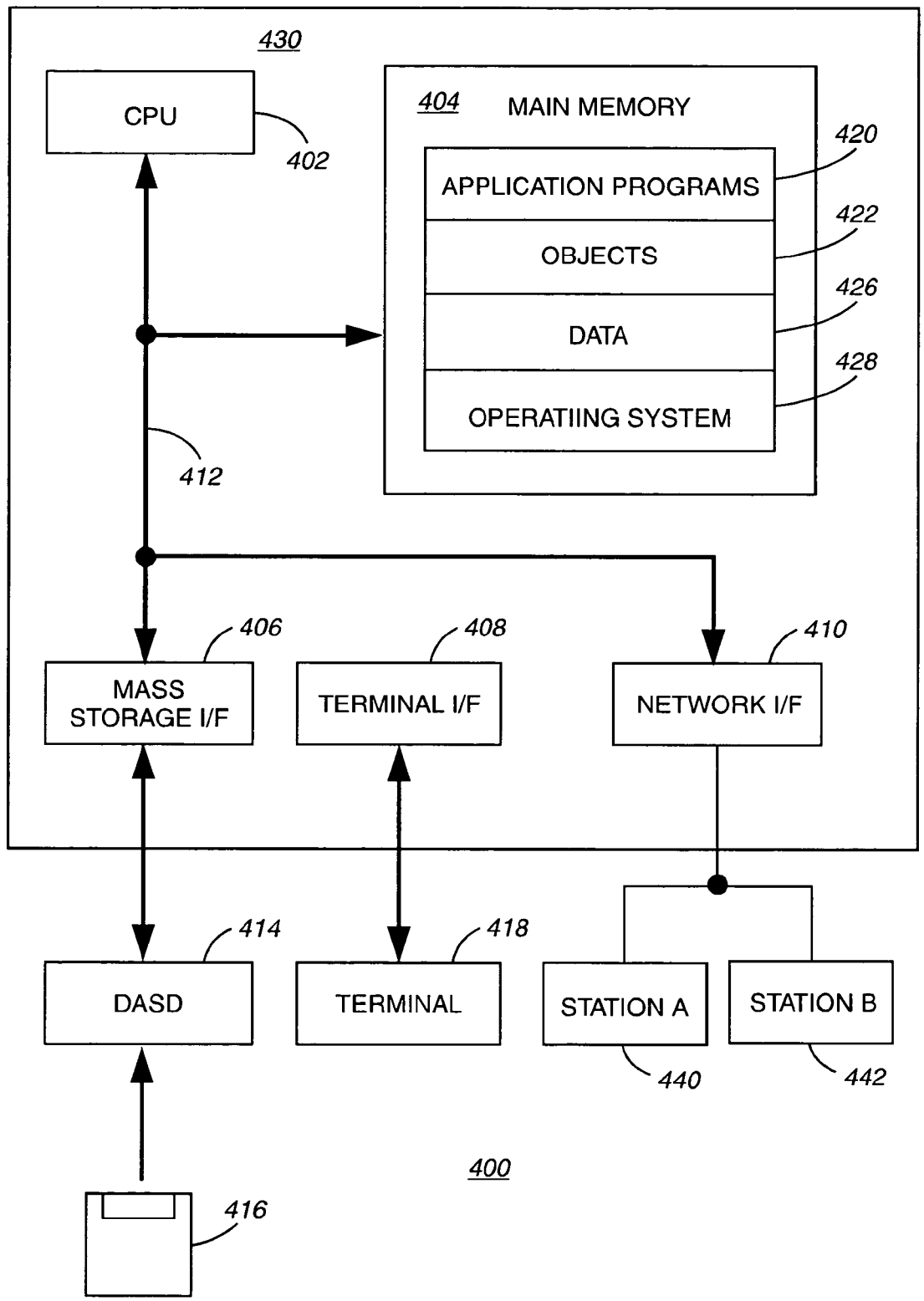
FIG. 4 illustrates a block diagram of an exemplary data processor as utilized by an exemplary embodiment of the present invention.

FIG. 4 illustrates a block diagram of an exemplary data processor 400 as utilized by an exemplary embodiment of the present invention. Any suitably configured processing system is able to be used by embodiments of the present invention. The computer system 400 has a processor 402 that is connected to a main memory 404, mass storage interface 406, terminal interface 408 and network interface 410. These system components are interconnected by a system bus 412. Mass storage interface 406 is used to connect mass storage devices, such as DASD device 414, to the computer system 400. One specific type of DASD device is a floppy disk drive, which may be used to store data to and read data from a floppy diskette 416.

Main Memory 404 contains application programs 420, objects 422, data 426 and an operating system image 428. Although illustrated as concurrently resident in main memory 404, it is clear that the applications programs 420, objects 422, data 426 and operating system 428 are not required to be completely resident in the main memory 404 at all times or even at the same time. Computer system 400 utilizes conventional virtual addressing mechanisms to allow programs to behave as if they have access to a large, single storage entity, referred to herein as a computer system memory, instead of access to multiple, smaller storage entities such as main memory 404 and DASD device 414. Note that the term "computer system memory" is used herein to generically refer to the entire virtual memory of computer system 400.

Operating system 428 is a suitable multitasking operating system. Operating system 428 includes a DASD management user interface program 430, a DASD storage management program 432 and a group user interface program 434. Embodiments of the present invention utilize architectures that allow instructions of the components of operating system 428 to be executed on any processor within computer 400.

Although only one CPU 402 is illustrated for computer 402, computer systems with multiple CPUs can be used equally effectively. Embodiments of the present invention incorporate interfaces that each includes-separate, fully programmed microprocessors that are used to off-load processing from the CPU 402. Terminal interface 408 is used to directly connect one or more terminals 418 to computer system 400. These terminals 418, which are able to be non-intelligent or fully programmable workstations, are used to allow system administrators and users to communicate with computer system 400.

Network interface 410 is used to connect other computer systems or cluster resource group members, e.g., Station A 440 and Station B 442, to computer system 400. The present invention works with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 416, CD ROM, or other form of recordable media, or via any type of electronic transmission mechanism.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for defining a service monitor for a web service, the method comprising:

accepting by a processor a functional web service that operates as one of a plurality of functional web services all operating on a single server;

including in the functional web service at least one monitor data collection function that records at least one monitor data element, the at least one monitor data element characterizing at least one operation of the functional web service, and the at least one monitor data element being made available to the monitoring service;

defining at least one functional web service description language (WSDL) document for the functional web service;

defining a monitor web service, separate from the functional web service, the monitor web service providing access to the at least one monitor data element recorded by the at least one data collection function included within the functional web service; and including, in the at least one functional web service description language (WSDL) document, a reference to a monitoring web service description language (WSDL)

document defining the monitoring service, wherein the monitoring web service description language (WSDL) document is separate from the functional web service description language (WSDL) document.

2. The method according to claim 1, wherein the monitor data collection function included in the functional web service stores the at least one monitor data element into a monitoring information store, and wherein the monitoring service accesses the monitor data element stored in the monitoring information store in response to receiving a status request.

3. The method according to claim 1, wherein the at least one monitor data element comprises at least one of a start time for processing by the functional web service of requests received from a web service client for an operation, an end time for processing of the requests by the functional web service, an operation name of the functional web service, an end point name within the functional web service, and input parameters for the functional web service operation.

4. The method according to claim 1, wherein the monitoring service is developed prior to the functional web service.

5. The method according to claim 1, wherein the monitoring service is developed after the functional web service.

6. The method according to claim 1, wherein the including a reference is automatically performed by a web service development tool.

7. The method according to claim 1, wherein the monitoring web service provides access to a plurality of monitor data elements recorded by respective data collection functions included in multiple web services.

8. The method according to claim 1, wherein the at least one monitor data element comprises at least one of a raw data element contained within the functional web service and a summary of raw data elements contained within the functional web service.

9. The method according to claim 8, wherein the summary of raw data elements comprises at least one of an average of a raw data element contained within the functional web service, a minimum value of a raw data element contained within the functional web service, a maximum value of a raw data element contained within the functional web service, a distribution of values of a raw data element contained within the functional web service, a periodically collected raw data element contained within the functional web service and a summary of a pre-defined number of raw values contained within the functional web service.

10. The method according to claim 1, wherein the monitoring web service description language document refers to a monitoring service instantiation that executes on a monitoring server.

11. The method according to claim 10, wherein the functional web service is designed to execute on a server separate from the monitoring web server.

12. The method according to claim 10, wherein the functional web service is designed to execute on the monitoring web server.

13. The method of claim 1, wherein the at least one functional web service description language document consists of a single web service description document.

14. The method of claim 1, wherein the functional web service provides functional services other than status monitoring services and supporting dummy requests for performance monitoring.

15. The method of claim 1, wherein the monitoring web service description language document is separate from the at least one functional web service description language document.

16. A web service development system comprising:
a processor; and
a memory, communicatively coupled to the processor, the memory comprising machine executable programs executable by the processor, the programs comprising:
a web service definition tool that:
accepts a functional web service that operates as one of a plurality of functional web services all operating on a single server;
includes in the functional web service at least one monitor data collection function that records at least one monitor data element,
the at least one monitor data element characterizing at least one operation of the functional web service, and
the at least one monitor data element being made available to the monitoring service;
defines at least one functional web service description language (WSDL) document for the functional web service; and
defines a monitor web service, separate from the functional web service, the monitor web service providing access to the at least one monitor data element recorded by the at least one data collection function included within the functional web service;
a monitor tag inserter that includes, in the at least one functional web service description language (WSDL) document, a reference to a monitoring web service description language (WSDL) document defining the monitoring service, wherein the monitoring web service description language (WSDL) document is separate from the functional web service description language (WSDL) document.

17. The web service development system according to claim 16, wherein the monitor data collection function included in the functional web service stores the at least one monitor data element into a monitoring information store, and wherein the monitoring service accesses the monitor data element stored in the monitoring information store in response to receiving a status request.

18. The web service development system according to claim 16, wherein the at least one monitor data element comprises at least one of a start time for processing by the functional web service of requests received from a web service client for an operation, an end time for processing of the requests by the functional web service, an operation name of the functional web service, an end point name within the functional web service, and input parameters for the functional web service operation.

19. The web service development system according to claim 16, wherein the at least one monitor data element comprises at least one of a raw data element contained within the functional web service and a summary of raw data elements contained within the functional web service.

20. The web service development system according to claim 19, wherein the summary of raw data elements comprises at least one of an average of a raw data element contained within the functional web service, a minimum value of a raw data element contained within the functional web service, a maximum value of a raw data element contained within the functional web service, a distribution of values of a raw data element contained within the functional web service, a periodically collected raw data element contained within the functional web service and a summary of a pre-defined number of raw values contained within the functional web service.

21. The web service development system according to claim 16, wherein the monitor tag inserter includes a reference to a monitor document containing a web service description language document for a monitoring service instantiation that executes on a monitoring server.

22. The web service development system according to claim 21, wherein the web service development tool defines the functional web service to execute on a server separate from the monitoring web server.

23. The web service development system according to claim 21, wherein the web service development tool defines the functional web service to execute on the monitoring web server.

24. A tangible computer readable storage medium including computer instructions for defining a service monitor for a web service, the computer instructions comprising instructions for:
  accepting a functional web service that operates as one of a plurality of functional web services all operating on a single server;
  including in the functional web service at least one monitor data collection function that records at least one monitor data element,
    the at least one monitor data element characterizing at least one operation of the functional web service, and
    the at least one monitor data element being made available to the monitoring service;
  defining at least one functional web service description language (WSDL) document for the functional web service;
  defining a monitor web service, separate from the functional web service, the monitor web service providing access to the at least one monitor data element recorded by the at least one data collection function included within the functional web service; and
  including, in the at least one functional web service description language document (WSDL), a reference to a monitoring web service description language (WSDL) document defining the monitoring service, wherein the monitoring web service description language (WSDL) document is separate from the functional web service description language (WSDL) document.

25. The tangible computer readable storage medium according to claim 24, wherein the monitor data collection function included in the functional web service stores the at least one monitor data element into a monitoring information store, and wherein the monitoring service accesses the monitor data element stored in the monitoring information store in response to receiving a status request.

26. The tangible computer readable storage medium according to claim 24, wherein the at least one monitor data element comprises at least one of a start time for processing by the functional web service of requests received from a web service client for an operation, an end time for processing of the requests by the functional web service, an operation name of the functional web service, an end point name of the functional web service, and input parameters for the functional web service operation.

27. The tangible computer readable storage medium according to claim 24, wherein the at least one monitor data collection function comprises a counter of events associated with the web service.

28. The tangible computer readable storage medium according to claim 24, wherein the monitoring service is developed after the functional web service.

29. The tangible computer readable storage medium according to claim 24, wherein the including a reference to a monitor document is automatically performed by a web service development tool.

30. The tangible computer readable storage medium according to claim 24, wherein the monitoring web service provides access to a plurality of monitor data elements recorded by respective data collection functions included in multiple web services.

31. The tangible computer readable storage medium according to claim 24, wherein the monitoring web service description language document refers to a monitoring service instantiation that executes on a monitoring server.

32. The tangible computer readable medium according to claim 31, wherein the functional web service is designed to execute on at least one of a server separate from the monitoring web server and the monitoring server.

33. A tangible computer readable storage medium with a machine readable web service description language file stored thereon, the web service description language file comprising:
  a functional web service definition defining at least one functional web service that operates as one of a plurality of functional web services all operating on a single server, the at least one functional web service comprising at least one monitor data collection function that records at least one monitor data element,
    the at least one monitor data element characterizing at least one operation of the functional web service, and
    the at least one monitor data element being made available to a monitoring service; and
  a reference to a monitor web service description language (WSDL) document defining the monitoring service, the monitoring service being separate from the functional web service, the monitor web service providing access to the at least one monitor data element recorded by the at least one data collection function included within the functional web service, wherein the monitoring web service description language (WSDL) document is separate from the functional web service description language (WSDL) document.

* * * * *